United States Patent

Wong et al.

[11] Patent Number: 5,796,879
[45] Date of Patent: Aug. 18, 1998

[54] AREA BASED INTERPOLATION FOR IMAGE SCALING

[75] Inventors: Ping Wah Wong, Sunnyvale; Cormac Herley, Mountain View, both of Calif.

[73] Assignee: Hewlett-Packard Company, Palo Alto, Calif.

[21] Appl. No.: 447,863

[22] Filed: May 23, 1995

[51] Int. Cl.$^6$ .................... H04N 1/393; G06K 15/36; G06K 9/64; G06K 9/32
[52] U.S. Cl. .................... 382/300; 382/279; 382/299; 358/451
[58] Field of Search .................... 358/451, 528, 358/537, 428, 452; 395/102; 382/279, 298, 299, 300

[56] References Cited

U.S. PATENT DOCUMENTS

| 5,335,293 | 8/1994 | Vannelli et al. | 382/191 |
| 5,453,844 | 9/1995 | George et al. | 358/426 |

FOREIGN PATENT DOCUMENTS

| 0696017 | 2/1996 | European Pat. Off. | G06T 3/40 |

OTHER PUBLICATIONS

Cormac Herley, "Multirate Operations for Exact Interpolation and Iterative Subdivision Schemes", ISCAS, Digital Signal Processing (DSP) London, May 30–Jun. 2, 1994, vol. 2, May 30, 1994, IEEE, pp. 169–172.

Jonathan Yen, "Binary Image Scaling by Piecewise Polynomial Interpolation",4th International Conference on Computer–Aided Design and Computer Graphics, Wuhan, China, 23-25 Oct. 1995, vol. 2644, Proceedings of the SPIE-The International Society for Optical Engineering, 1996, pp. 2–8.

R.V. Klassen, R. H. Bartels: "Using B-Splines for Re–sizing Images", Technical Report, University of Waterloo, Department of Computer Science, 1986, Canada.

*Primary Examiner*—Edward L. Coles
*Assistant Examiner*—Kimberly A. Williams

[57] ABSTRACT

A technique, referred to as area-based interpolation, performs image interpolation. The system determines a curve by the pixel value at a location by taking the integral of a curve over a small area, where the size of the area is determined by the sampling size of a sampling cell. When the image is resampled with respect to a sampling cell that has a finer spacing, the system integrates the polynomial using a finer integration area. In accordance with the invention, the relation between the reintegrated, resampled high resolution image and the low resolution image is a function of an up-sampler, followed by a linear filter. The coefficients of the filter are independent of the data, but are dependent on the family of curves used. If the system models by, for example, a third degree or fourth degree polynomial everywhere in the image, then that model determines the number of coefficients that are in the filter. Once the up-sampling factor and degree of the polynomial are determined, the filter coefficients are fixed, and can be calculated by solving a set of linear equations. It is not necessary to determine these values on an image-by-image basis. The system calculates the filter once and the consistency constraint is then satisfied for all image scaling.

25 Claims, 4 Drawing Sheets

AREA BASED INTERPOLATION FOR IMAGE SCALING

BACKGROUND OF THE INVENTION

1. Technical Field

The invention relates to the production of high resolution images. More particularly, the invention relates to the use of image interpolation to produce a high resolution image that looks as though it was generated directly from a high resolution sampling device.

2. Description of the Prior Art

One goal of image interpolation is to produce a high-resolution image that looks as though it actually came from a high resolution sampling device. Commonly, the acquisition device is a Charge Coupled Device (CCD) which consists of an array of sensors, where each sensor returns a number that is proportional to the average of the light falling on it. To a first order, the CCD array can be modelled as a rectangular grid, where there is negligible spacing between sensors, and each sensor is uniformly sensitive across its area (see FIG. 1). Thus, if the light incident on the two-dimensional array is I(u,v) the output of a single sensor is:

$$x_{mn} = \frac{1}{L_{mn}} \int_{R_{mn}} \int I(u,v) du dv, \tag{1}$$

where $L_{mn}$ is the area occupied by the sensor at the region $R_{m,n}$.

A higher resolution CCD camera has more sensors to represent an image of the same size, and the area $H_{mn}$ of each sensor is smaller ($H_{mn} < L_{mn}$).

If a high resolution array were available, the array's output would be:

$$y_{mn} = \frac{1}{H_{mn}} \int_{S_{mn}} \int I(u,v) du dv. \tag{2}$$

where $H_{mn}$ is the area occupied by the sensor at the region $S_{m,n}$.

In scaling the low resolution image $x_{mn}$ it is desirable to produce a high resolution image $\hat{y}_{mn}$ that is as close as possible to $y_{mn}$. While $y_{mn}$ is unknown, it is known that it has the form given in Eq. (2) above. It is desirable to constrain the interpolated image $\hat{y}_{mn}$ as at least a possible output of the acquisition device for some image $\hat{I}(u,v)$, such that:

$$\hat{y}_{mn} = \frac{1}{H_{mn}} \int_{S_{mn}} \int \hat{I}(u,v) du dv. \tag{3}$$

$$x_{mn} = \frac{1}{L_{mn}} \int_{R_{mn}} \int \hat{I}(u,v) du dv. \tag{4}$$

Thus, from Eqs. (3) and (4) above, the value $\hat{y}_{mn}$ is a consistent estimate of $y_{mn}$ with respect to the low resolution data $x_{mn}$ and the first order sensor model. In other words, both $\hat{y}_{mn}$ and $x_{mn}$ should be valid outputs of the high and low resolution acquisition devices for some waveform $\hat{I}(u,v)$.

Note that Eqs. (3) and (4) also imply that if an image is enlarged, and then the image is scaled down, the result of these two consecutive steps generates an image that is identical to the original image.

There are many cells on the surface of a CCD (see FIG. 1), where each cell captures one unit of an image, which is typically referred to as a pixel. The value of the pixel is proportional to the average of the light that shines on that particular area of the CCD. If one was to use a high resolution CCD, for example a CCD having four times the number of pixels of a lower resolution CCD (see FIG. 2), then each one of the four pixels 21, 23, 25, 27 is roughly one quarter of the size of the original large pixels 22. Thus, the average of light that shines on the four smaller pixels 21, 23, 25, 27 is equal to the average of the light that shines on one large pixel 22. Therefore:

$$X_{m,n} = \text{avg}(y_{2m,2n}, y_{2m,2n+1}, y_{2m+1,2n}, y_{2m+1,2n+1}) \tag{5}$$

The goal of high resolution image scaling while maintaining data consistency was shown to be achievable with a previous algorithm (see J. Allebach, P. W. Wong, *Magnifying Digital Image Using Edge Mapping*, U.S. patent application Ser. No. 08/412,640, filed 29 Mar. 1995, which is a continuation of Ser. No. 08/227,765, filed 14 Apr. 1994). The disclosed approach involves an iterative stage (see FIG. 3) that consists of a sensor model 32, and is thus computationally costly. The algorithm takes true sensor data 30 to form a small image and magnifies the small image to produce a large image (the interpolated image 31). This is shown in the figure by the low resolution path 33 and the high resolution path 34.

A feedback path through the sensor model 32 applies the characteristics of the CCD to maintain data consistency. Accordingly, this approach uses the sensor model to scale down the output image. Once the image is scaled down, it is an image that corresponds in the size to the estimated sensor data, which should be the same size image as that of the true sensor data. The algorithm compares these data to determine how much difference there is between the estimated image and the actual image, and then uses the difference to correct the interpolated image with a data correction module 35.

Contrary to the case of scaling one-dimensional band limited signals such as speech, where the goal is to design a filter with response as close as possible to an ideal brickwall filter (see, D. J. Goodman, M. J. Carey, *Nine digital filters for decimation and interpolation*, IEEE Transaction on Acoustics, Speech, and Signal Processing, vol. ASSP-25, pp. 121–126, April 1977), achieving good frequency response in the traditional sense is not the main goal for image scaling. An explanation of this can be given by observing that if the M-fold interpolator is a very good 1/M low pass filter, then the region of the frequency spectrum $|\omega|>\pi/M$ in the interpolated image is very close to zero. Thus, the scaled image contains only very low frequency energy, and hence no sharp edges can be reproduced. This correlates well with the accepted wisdom in image scaling that windowed sinc filters generally produce scaled images that look blurred.

A key problem to be addressed then is how to scale images and produce high quality outputs from low resolution acquisition devices. As discussed above, the assumption of band limitedness is a poor assumption for images, and there is no model for image spectra that is sufficiently accurate to allow exact reconstruction from samples. Another way of expressing this is to say that the difficulty in constructing the high frequency component in images is a serious obstacle to image scaling.

SUMMARY OF THE INVENTION

As discussed above, a key problem in image interpolation is that the area based sampling of the CCD device is different from the point sampling more commonly used for one dimensional signals. The invention provides a technique, referred to herein as area-based interpolation, that performs image interpolation, satisfying the constraints set forth in Eqs. (3) and (4) above.

Conceptually, if Î(u,v) is a piecewise curve in the variable u and in the variable v, then the system finds a solution to Eq. (3), consistent with the data $x_{mn}$, as required by Eq (4).

The system determines a curve by equating a pixel value with the integral of a curve over a small area, where the size of the area is determined by the sampling size of the CCD cell. When the image is resampled with respect to a CCD cell that has a finer spacing, the system integrates the polynomial using a finer integration area.

In accordance with the invention, the relation between the reintegrated, resampled high resolution image and the low resolution image is a function of an up-sampler, followed by a linear filter. The coefficients of the filter are independent of the data, but are dependent on the family of curves used. If the system models by a third degree or fourth degree polynomial everywhere in the image, then that model determines the number of coefficients that are in the filter. Once the up-sampling factor and degree of the polynomial are determined, the filter coefficients are fixed. It is not necessary to determine these values on an image-by-image basis. The system calculates the filter once and the consistency constraint is then satisfied for all image scaling.

DETAILED DESCRIPTION OF THE INVENTION

The invention provides an area based interpolation technique that can much more easily magnify an image while maintaining data consistency, without requiring the complicated calculations of the prior art. Essentially, the invention provides a system that maintains the consistency constraint without using feedback which is hardware intensive and computationally expensive. The system determines a curve by equating a pixel value with the integral of the curve over an area determined by the sampling size of the CCD cell. When the image is resampled with respect to a CCD cell that has a finer spacing, the system integrates the curve over a smaller area.

The relation between the reintegrated, resampled high resolution image and the low resolution image is a function of an up-sampler, followed by a linear filter. The coefficients of the filter are independent of the data, but are dependent on the specific curve used. In an embodiment of the invention where polynomials are used, the coefficients are dependent on the degree of polynomial approximation used. If the system models by a third degree or fourth degree polynomial locally everywhere in the image, then that model determines the number of coefficients that are in the filter. Once the up-sampling factor and degree of the polynomial are determined, the filter coefficients are fixed. It is not necessary to determine these values on an image-by-image basis. The system calculates the filter once and the consistency constraint is then satisfied for all image scaling.

Figure 1:
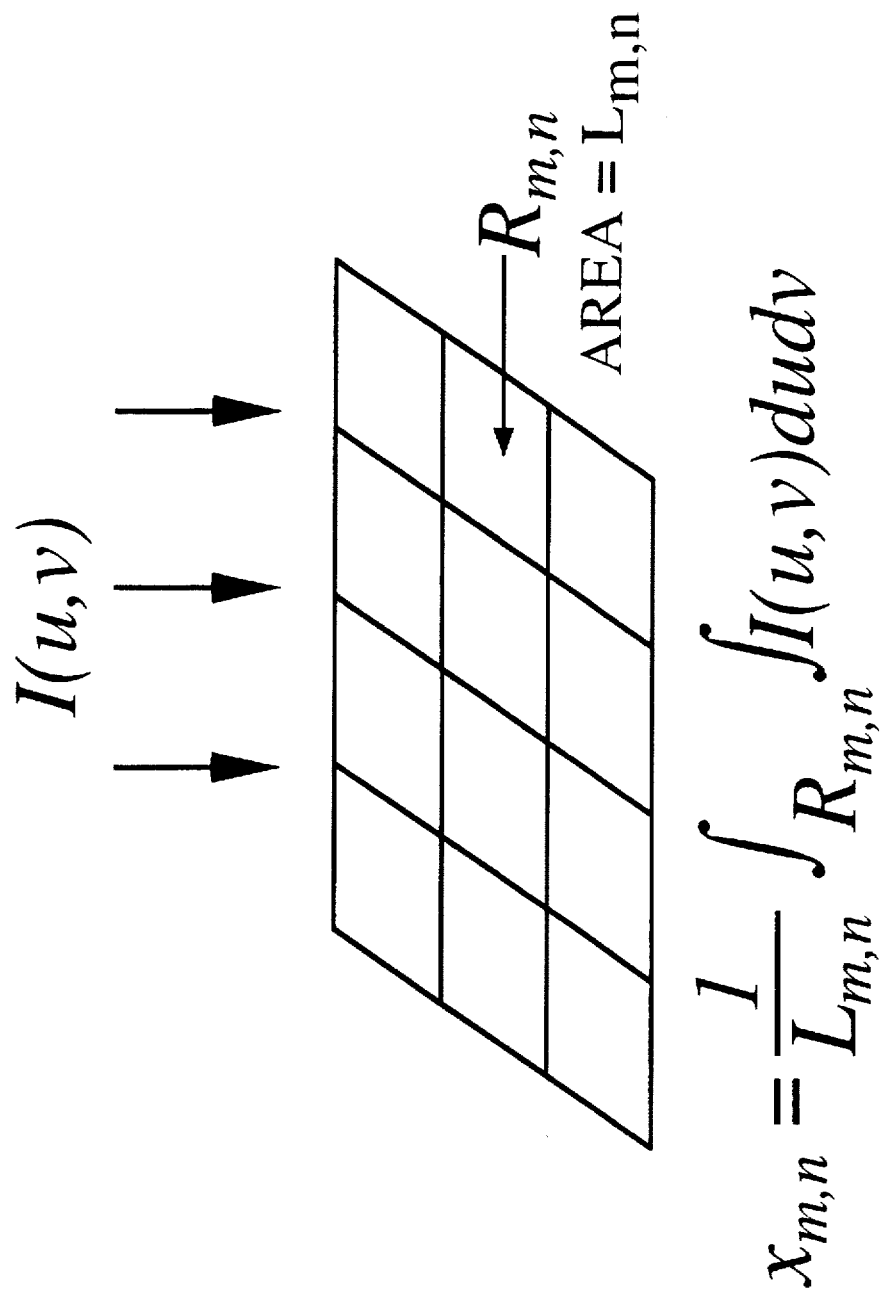
FIG. 1 is a schematic diagram showing a sensor model.
Figure 2:
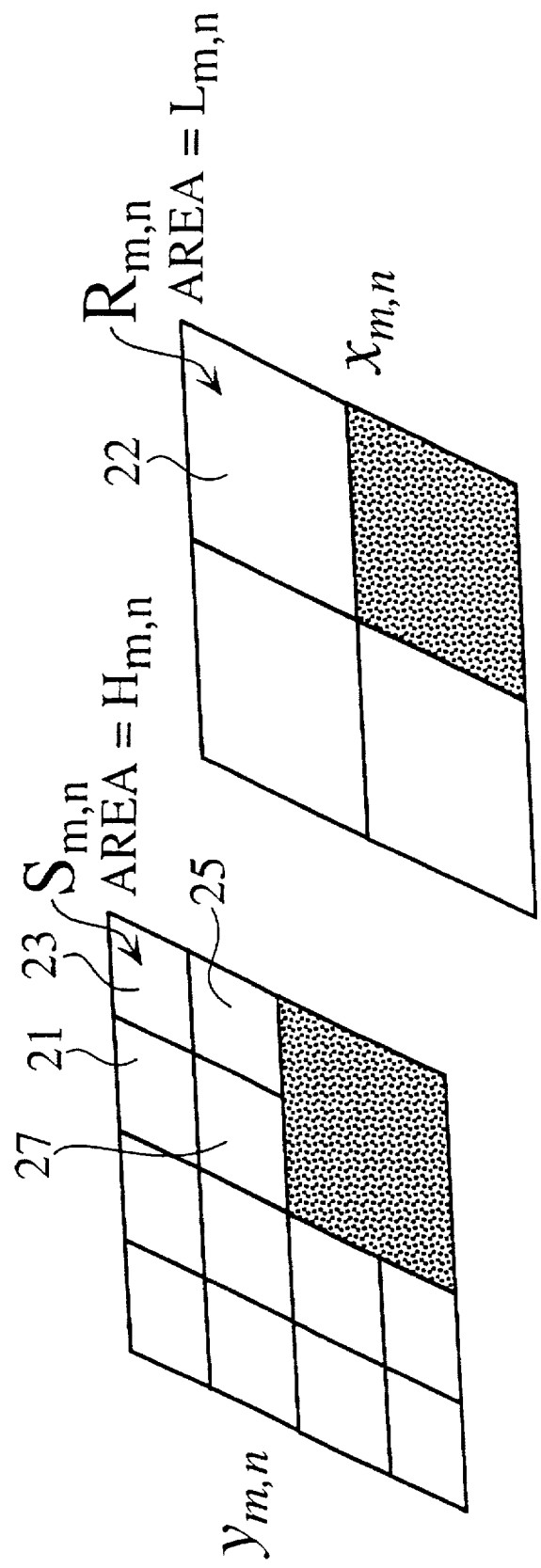
FIG. 2 is a schematic diagram showing data consistency constraints for two CCDs, each of which has a different degree of resolution.
Figure 3:
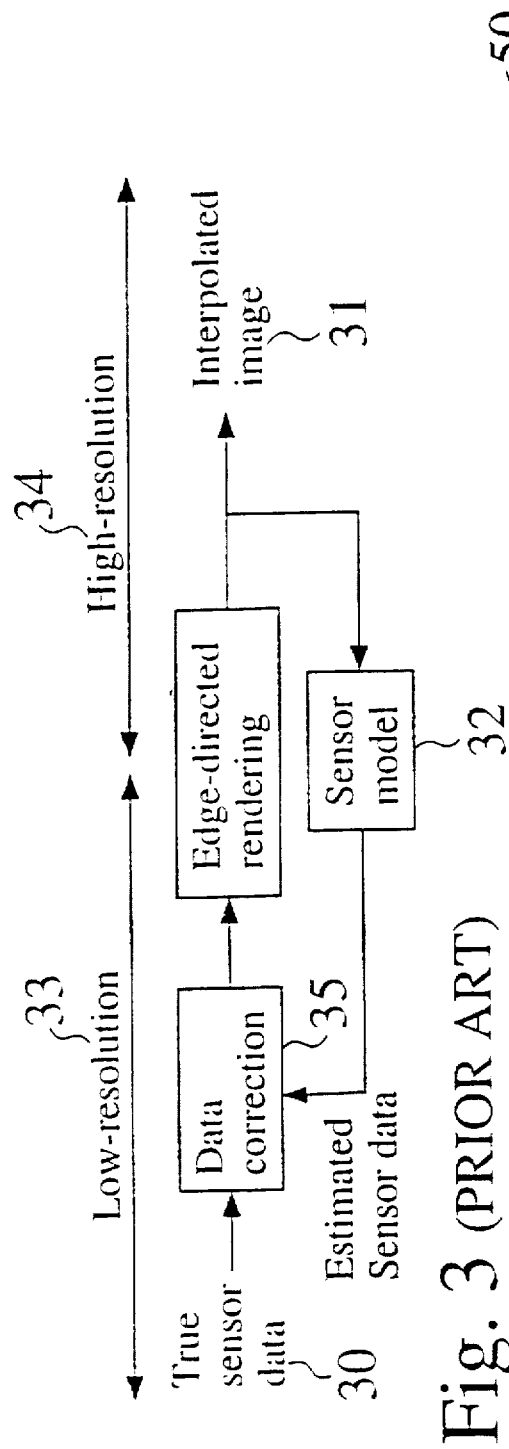
FIG. 3 is a block schematic diagram of a prior art edge-directed interpolation scheme.

As discussed above, the CCD consists of individual cells, each of which returns the average of the light that shines on the cell. If an image is captured by a CCD having a large cell area, then a small image is produced because there is a small number of pixels in the image. If an image is captured by a CCD having a small pixel size, then there is a large number of pixels, and therefore the image is larger. Consider two CCDs where one CCD has four times as many pixels as the other CCD. If the same scene is captured using both of these CCD's at the same time, then the average of the light that shines on one pixel in a larger CCD (see FIG. 2) is the same as the average of all of the light that shines on four pixels in a CCD that has four times the resolution.

Figure 4:
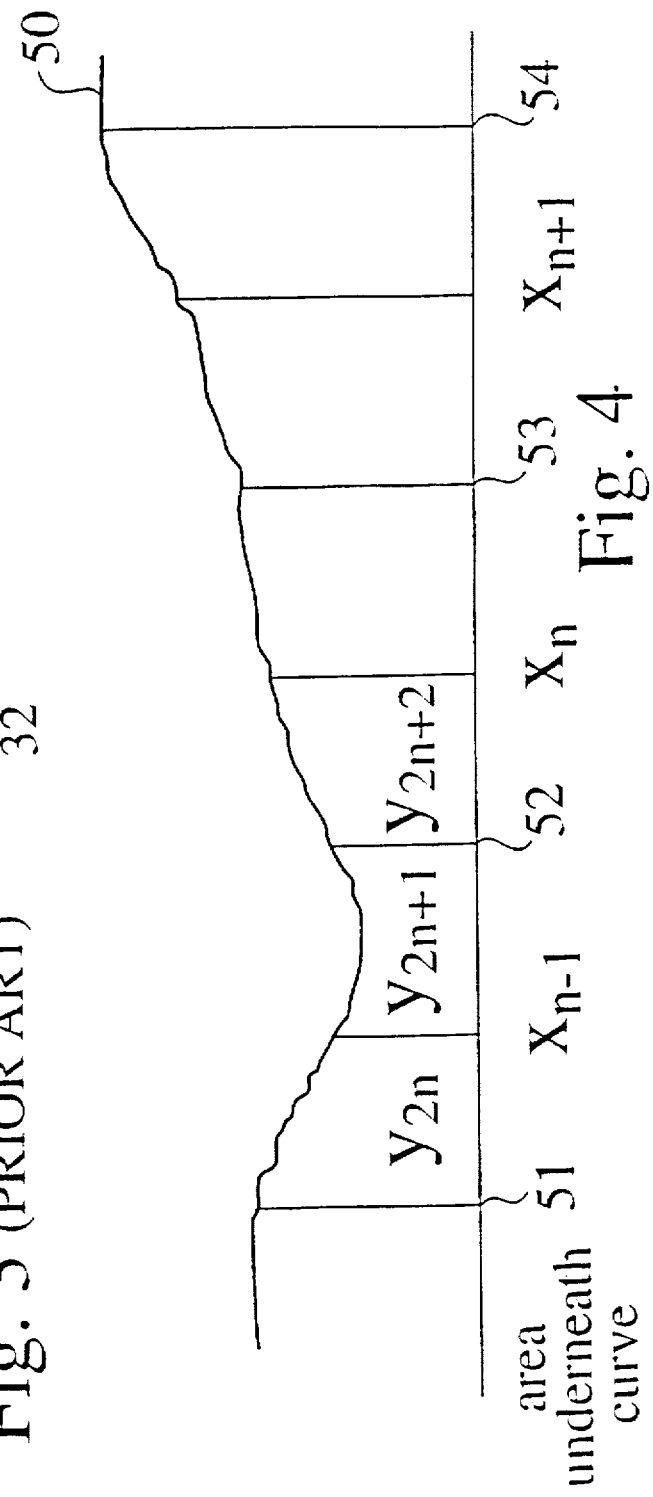
FIG. 4 is a graph that plots a curve showing an area based interpolation scheme according to the invention.

FIG. 4 is a graph that plots a curve showing an area based interpolation scheme according to the invention. The figure provides a one-dimensional example that illustrates an image as a curve 50, which is the profile of the light intensity on a CCD. Although the exact curve is not known, the values $X_{N-1}, X_N, X_{N+1} \ldots$ are known. Each of these values is the integral of the curve within each of the sets of bold vertical lines, i.e. 51/52, 52/53, and 53/54 or, put another way, the area underneath the curve over an interval. Thus, if $X_N$ is the area underneath the curve 50 between the two bold lines 52/53, then $X_{N-1}$ is the area under the curve 50 between the two bold lines 51/52, and so on.

Figure 5:
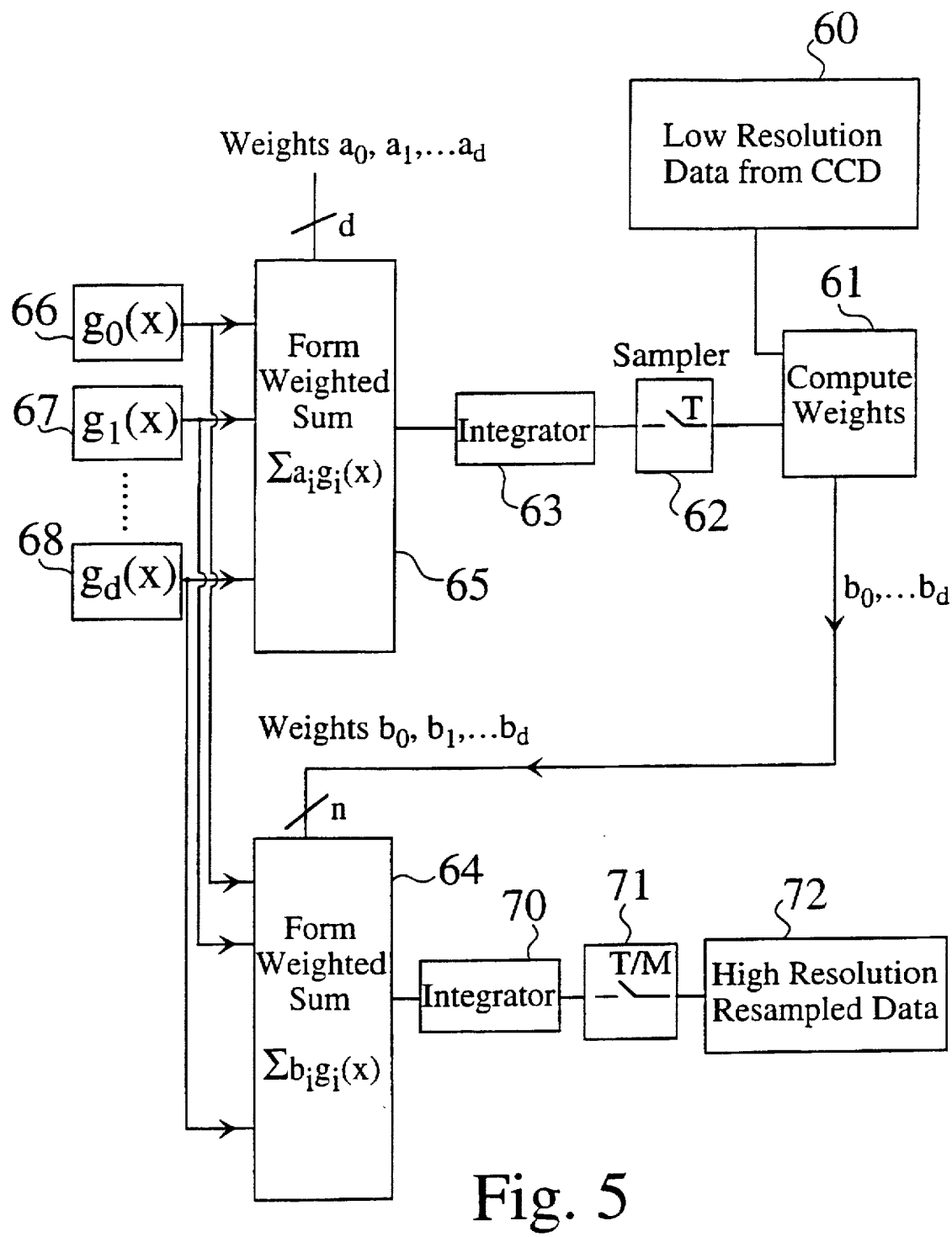
FIG. 5 is a block schematic diagram of a hardware implementation of the area based interpolation scheme according to the invention.

FIG. 5 is a block schematic diagram of a hardware implementation of the area based interpolation scheme according to the invention. The system is comprised as follows:

A function of a continuous variable t is formed as a weighted sum of basis functions $g_0(t), g_1(t), \ldots, g_d(t)$:

$$\sum_{i=0}^{d} a_i g_i(t).$$

In one embodiment of the invention, the basis functions $g_i(t)$ 66–68 are polynomial segments of degree i, and in this case the weighted sum is a piecewise polynomial. Other types of basis functions, such as trigonometric functions, are also possible. The weighted sum 65 is passed through an integrating element 63, and a sampler 62 which samples the integrated weighted sum at intervals of spacing T in the t variable. This weighted sequence is compared 61 with the actual observed data from the low resolution sensor 60. It is desirable that the two values be identical. The weights $a_i$ are computed, such that the weighted sum, after integration and sampling, produces a sequence that is identical to the observed data. When this occurs with a particular set of weights, those weights are labelled $b_i$ and then the weighted sum:

$$\sum_{i=0}^{d} b_i g_i(t)$$

is a consistent reconstruction 64 of the original unknown function of the continuous variable. This weighted sum is again integrated 70, and resampled 71, but using a spacing of T/M in the t variable. The resulting sequence is the high resolution approximation 72.

In the case where the basis function $g_i(t)$ are piecewise polynomials, calculating the weights $b_i$ such that the integrated sampled weighted sum equals the observed data is a matter of solving a set of linear equations. Further, when it comes to implementation, it is possible to calculate the consistent high resolution samples from the low resolution observed data by using an upsampler, followed by a filter. The coefficients of the filter are independent of the data.

One goal of the invention is to provide a simple non-iterative approach to image scaling. For example, consider a one dimensional example of the problem where the signal is a piecewise polynomial of degree two. Thus:

$$f(t)=\alpha_2 t^2+\alpha_1 t+\alpha_0 \ t\in(-1.5,1.5) \qquad (6)$$

In this example, $d=2$ and $g_0(t)=1$, $g_1(t)=t$, and $g_2(t)=t^2$. Furthermore, it is assumed that the sampling interval of the low resolution sampled signal is of length one. In a point sampling operation, the signal is evaluated at discrete locations $f_n=f(n)$. However, because of the integrating property of the CCD, the samples obtained are instead of the form:

$$x_n = \int_{n-1/2}^{n+1/2} f(t)dt \quad n=-1,0,1 \qquad (7)$$

at location n. Thus, for example, the following can be derived:

$$x_{-1} = a_2 t^3/3 \Big|_{-3/2}^{1/2} + a_1 t^2/2 \Big|_{-3/2}^{1/2} + a_0 t \Big|_{-3/2}^{1/2} \qquad (8)$$

$$= 13a_2/12 - a_1 - a_0 \qquad (9)$$

Similarly, $x_0=a_2/12+a_0$ and $x_1=13\ a_2/12+a_1+a_0$.

Because the $f_n$s are the measured data points from the CCD, the coefficients of the local polynomial approximation can be determined by solving the 3×3 system:

$$\begin{bmatrix} 13/12 & -1 & 1 \\ 1/12 & 0 & 1 \\ 13/12 & 1 & 1 \end{bmatrix} \begin{bmatrix} a_2 \\ a_1 \\ a_0 \end{bmatrix} = \begin{bmatrix} x_{-1} \\ x_0 \\ x_1 \end{bmatrix} \qquad (10)$$

Having determined the coefficients of the polynomial that models the data in this region, it is possible to resample with respect to a sensor that has resolution which is higher by a factor of M (assuming that M is odd):

$$y_k = \int_{k-1/2M}^{k+1/2M} f(t)dt \quad k=-(M-1)/2,\ldots(M-1)/2. \qquad (11)$$

If the upsampling factor M=3, then:

$$\begin{bmatrix} y_{3n-1} \\ y_{3n} \\ y_{3n+1} \end{bmatrix} = \frac{1}{27} \begin{bmatrix} 5 & 26 & -4 \\ -1 & 29 & -1 \\ -4 & 26 & 5 \end{bmatrix} \cdot \begin{bmatrix} x_{n-1} \\ x_n \\ x_{n+1} \end{bmatrix} \qquad (12)$$

and this can be repeated for all n.

Thus, the three interleaved sequences $y_{3n-1}$, $y_{3n}$, and $y_{3n+1}$ are computed by separate filtering operations on the sequence $x_n$, such that the coefficients of the filters do not depend on the data. An exactly similar case is found where M is even. Alternatively, the higher rate sequence $y_n$ can be written as a filtered version of $x_n$, after it is first upsampled by a factor of M=3. Note that these new samples are automatically consistent, in the sense defined above, with the low resolution data.

The above is an example for a fixed degree piecewise polynomial approximation, but the same calculations can be carried out for a polynomial approximation of any degree and for any scaling factor. It is always the case that the combined effect of evaluating the coefficients of the piecewise polynomial approximation, and resampling by integration, can be written as an upsampling operation followed by a single data independent filter. The following is a Matlab pseudocode routine that calculates the filter for any upsampling factor M, and any degree of polynomial approximation N.

Example—Matlab Routine

```
% Get the interpolation filter (area based)

% N degree of poly approx
% M upsampling factor
%S spacing between original intervals; S=1 => edge to edge clear R0 R1 p mat
for i=1:N
    centre = (-(N-1)/2 +(i-1))*S;
    r = (centre + 1/2); l = centre - 1/2;
    for j = 1:N
        R0(i,j) = (r^(j) - l^(j))/(j);
    end
end
R0=fliplr(R0);

% accept responsibility only for the region (-S/2, S/2)
for i=1 : (M*S)
    centre = -S/2 + 1/(M*2) + (i-1)/M;
    l = centre - 1/(2*M);
    r = centre + 1/(2*M);
    for j=1:N
        R1 (i,j) = (r^(j) - l^(j))/(j);
    end
end
R1=fliplr(R1);

mat = R1 * inv(R0) * M
for i = MS : -1 : 1
    for j = SM - i + 1 : SM : SMN
        p(j) = mat(i,j);
    end
end
```

The length of the filter depends on the degree of the polynomial approximation chosen. Generally the degree of approximation should be kept small, for example three or four, because longer filters increase the complexity without significantly improving the performance. An additional parameter S gives freedom over the spacing between the CCD cells. If S=1, then this is equivalent to having the cells edge to edge with negligible gaps between them. Choosing S to be some other integer can be useful, for example if it is desired to interpolate color planes from a mosaic CCD camera, or if the spacing between cells is not negligible.

Assume that the CCD array consists of rectangular cells. Thus, if the low resolution sensor can be modeled by a two-dimensional function B (u,v), then this expression necessarily can be written separately $B(u,v)=B_x(u)\cdot B_y(v)$. Hence, interpolation along rows and columns is considered separably because there is no advantage to considering non-separable interpolation filters in this context.

The invention uses the light values for each pixel of the CCD to determine a curve that may or may not be identical to the curve that exactly matches the light intensity across the surface of the CCD, but rather that closely approximates the true curve in the sense that Eq. (4) is satisfied. Thus, the invention includes a means for determining a smooth curve, where the integral of the smooth curve in the appropriate areas is equal to the data generated by the CCD. For example, in one embodiment of the invention, the curve may be determined by using a polynomial because it is relatively easy to find the integrals of a polynomial. Given the data generated by the CCD, the integrals of the polynomial may be fitted to the data. Once a smooth curve is generated, then it is only necessary to integrate the curve in a small region, determine the area underneath the curve in the smaller region, and the interpolated value is then known from which the image may be scaled. Given this approach, the image is infinitely scalable. Thus, the data consistency constraint does not impose any restriction on the scaling factor.

An important aspect of the approach herein resides in the recognition that, if it is possible to find a function that satisfies Eq. 4, above, then it is possible to integrate, as in Eq. 3, above, to determine the high resolution data. There are actually an infinite number of solutions $\hat{I}(u,v)$ to Eq. 4, above. One of the simplest solutions, is to choose $\hat{I}(u,v)$ to be a piecewise polynomial. In this case, it is possible to determine the coefficients of the polynomials from the $x_{mn}$ and then re-integrate to get $\hat{y}_{mn}$.

The filter that gives order N polynomial approximation for upsampling by a factor of M has zeros of order N at each of the M−1 aliasing frequencies $2\pi k/M$, for k=1,2, . . . M−1. It is important to null these frequencies to prevent dc and low frequency components from producing spurious periodic artifacts.

Using the signal processing interpolation, a skilled person in this art can also perform the area based interpolation technique by the system using the following sequence of operations:

Deconvolve the data $x_{mn}$ by low resolution sensor function.

Upsample to the desired resolution.

Convolve the up-sampled data by a high resolution sensor function.

Low pass filter to remove spectral aliases.

A critical difference between the area-based filter and bilinear or other methods is that the area-based filter boosts the high frequencies. This is analogous to performing a modest amount of sharpening by using unsharp masking or similar methods. Thus, using the area based filtering approach is comparable to bilinear interpolation followed by modest sharpening, except that it requires less computation because there is no need to perform a separate filtering to obtain the high frequency mask. Furthermore, there is no need to decide on the amount of sharpening as in that approach.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

We claim:

1. A method for image scaling by area based interpolation, comprising the steps of:
    representing a section of an image as a function of a continuous variable;
    taking the integral of a curve for each area of said section, where the size of each area is determined by the sampling size of a first sampling cell;
    sampling said image at a first, low resolution with respect to said first sampling cell, wherein a pixel value is determined for each area of said section;
    resampling said image at a second, higher resolution with respect to a second sampling cell that has a finer spacing than that of said first sampling cell; and
    taking the integral of a curve for each area of said section, where the size of each area is determined by the sampling size of said second sampling cell.

2. The method of claim 1, wherein said sampling cell is a CCD.

3. The method of claim 1, wherein the relation between said resampled higher resolution image and said sampled image is a function of an up-sampler, followed by a linear filter.

4. The method of claim 1, wherein said curves are determined by using polynomials.

5. The method of claim 4, wherein the coefficients of said filter are independent of the data, but are dependent on the degree of polynomial approximation used.

6. The method of claim 4, further comprising the step of:
    recalculating said filter once, wherein the consistency constraint is satisfied for all image scaling.

7. A method for image scaling by area based interpolation, comprising the steps of:
    receiving low resolution image data having light values for pixels of a sampling cell;
    using the light values for each pixel of the sampling cell to determine an approximation curve that closely approximates a true curve that matches the light intensity across the surface of the sampling cell, such that the equation:

$$x_{mn} = \frac{1}{L_{mn}} \int_{R_{mn}} \int \hat{I}(u,v)dudv$$

is satisfied;
    where $\hat{I}(u,v)$ represents a waveform of an image;
    $x_{mn}$ is an output of a low resolution acquisition device for waveform $\hat{I}(u,v)$;
    $L_{mn}$ is the area occupied by the sensor at the region $R_{m,n}$; and
    outputting high resolution image data based on the approximation curve.

8. The method of claim 7, wherein said sampling cell is a CCD.

9. The method of claim 7, wherein the low resolution image is infinitely scalable.

10. The method of claim 7, wherein said curve is determined by using polynomials.

11. An apparatus for scaling an image by area based interpolation, the apparatus comprising:
    means for representing a section of an image as a function of a continuous variable;
    a first integrator for taking the integral of a curve for each area of said section, where the size of each area is determined by the sampling size of a first sampling cell;
    means for sampling said image at a first, low resolution with respect to said first sampling cell, wherein a pixel value is determined for each area of said section;
    means for resampling said image at a second, higher resolution with respect to a second sampling cell that has a finer spacing than that of said first sampling cell; and
    a second integrator for taking the integral of a curve for each area of said section, where the size of each area is determined by the sampling size of said second sampling cell.

12. The apparatus of claim 11, wherein the relation between said resampled higher resolution image and said sampled image is a function of an up-sampler, followed by a linear filter.

13. The apparatus of claim 12, wherein said curve is determined by using polynomials.

14. The apparatus of claim 13, wherein the coefficients of said linear filter are independent of the data, but are dependent on the degree of polynomial approximation used.

15. The apparatus of claim 13, further comprising:
means for recalculating said filter once, wherein the consistency constraint is satisfied for all image scaling.

16. The apparatus of claim 11, wherein said sampling cell is a CCD.

17. An apparatus for image scaling by area based interpolation, comprising:
means for receiving low resolution image data having light values for pixels of a sampling cell;
means for determining an approximation curve from the light values for each pixel of the sampling cell from the low resolution image, wherein the approximation curve closely approximates a true curve that matches the light intensity across the surface of the sampling cell, such that the equation:

$$x_{mn} = \frac{1}{L_{mn}} \int_{R_{mn}} \int \hat{I}(u, v) du dv$$

is satisfied;
where $\hat{I}(u,v)$ represents a waveform of an image;
$x_{mn}$ is an output of a low resolution acquisition device for waveform $\hat{I}(u,v)$;
$L_{mn}$ is the area occupied by the sensor at the region $R_{m,n}$; and
means for outputting high resolution image data based on the approximation curve.

18. The apparatus of claim 17, wherein said curve is determined by using polynomials.

19. The apparatus of claim 17, wherein said sampling cell is a CCD.

20. The apparatus of claim 17, wherein the low resolution image is infinitely scalable.

21. An apparatus for image scaling by area based interpolation, comprising:
an input to receive first resolution image data having light values for pixels of a sampling cell;
a curve approximator adapted to determine an approximation curve from the light values for each pixel of the sampling cell from the first resolution image, wherein the approximation curve closely approximates a true curve that matches the light intensity across the surface of the sampling cell;
an integrator adapted to integrate the approximation curve in a small region to determine the area underneath the approximation curve in the smaller region, using the integrated value to scale the first resolution image to a second resolution image; and
an output adapted to output the second resolution image data.

22. The apparatus of claim 21, wherein the curve is determined using polynomials.

23. The apparatus of claim 21, wherein the sampling cell is a CCD.

24. The apparatus of claim 21, wherein the first resolution image is infinitely scalable.

25. The apparatus of claim 21, wherein the first resolution image is of a lower resolution than the second resolution image.

* * * * *